United States Patent [19]
Seto

[11] 3,805,727
[45] Apr. 23, 1974

[54] PNEUMATICALLY-CONTROLLED HYDRAULICALLY-OPERATED SHIP STEERING APPARATUS

[75] Inventor: Tatsuo Seto, Mihara, Japan

[73] Assignee: Mitsubishi Jakogyo Kabushiki Kaisha, Tokyo, Japan

[22] Filed: July 30, 1973

[21] Appl. No.: 383,557

[52] U.S. Cl.................................. 114/150, 91/388
[51] Int. Cl......................... B63h 25/22, F15b 13/16
[58] Field of Search............ 114/150, 144 R; 60/403, 60/99, 444; 91/461, 186, 388

[56] References Cited
UNITED STATES PATENTS

| | | | |
|---|---|---|---|
| 137 | | | |
| 2,401,680 | 6/1946 | Eaton.................................. | 91/388 |
| 2,355,758 | 8/1944 | Stevens............................... | 137/102 |
| 2,859,592 | 11/1958 | Mercier et al....................... | 91/186 |
| 3,508,400 | 4/1970 | Mercier............................... | 114/150 |
| 3,395,617 | 8/1968 | Kaptur................................ | 91/461 |

*Primary Examiner*—Trygve M. Blix
*Assistant Examiner*—Charles E. Frankfort
*Attorney, Agent, or Firm*—W. F. Poore; Ralph W. McIntire, Jr.

[57] ABSTRACT

This invention relates to a pneumatically controlled hydraulically operated remote steering apparatus for ships. A manually operated device remotely located from the rudder of a ship supplies a pneumatic fluid under pressure via a double check valve to abutments that operate valves which effect operation of hydraulically operated valves for admitting hydraulic fluid under pressure to or releasing hydraulic fluid under pressure from one or the other of a pair of hydraulically operated fluid motors connected to the respective opposite ends of a ship rudder whereby the position of the rudder is controlled by the fluid motors.

10 Claims, 3 Drawing Figures

PNEUMATICALLY-CONTROLLED HYDRAULICALLY-OPERATED SHIP STEERING APPARATUS

BACKGROUND OF THE INVENTION

A remote steering device utilizing air pressure has never been used previously. In ships, compressed air is readily available and thus air pressure can be obtained easily and can be coupled with the oil pressure to carry out remote steering of ships. Therefore, the purpose of this invention is to use compressed air under pressure to control operation of oil pressure operated cylinders that move a rudder through a desired steering angle. The rudder operates a steering valve to cause cut off of oil pressure to the cylinder.

SUMMARY OF THE INVENTION

Compressed air is used to actuate an oil pressure switching valve to control operation of an oil pressure cylinder that rocks a rudder through a desired steering angle. The steering angle thus obtained is converted to air pressure by a steering angle indicator valve and the air pressure is then introduced into the oil pressure switching valve mentioned above to cause cut off of oil to the cylinder. When this air pressure supplied by the aforementioned steering valve becomes equal to the control air pressure, the aforementioned oil pressure switching valve will be actuated to close the oil pressure passage to the oil pressure operated cylinder. In this way, the steering valve always maintains an air pressure that is proportional to the steering angle. The steering apparatus constituting the present invention has fewer structural components than a corresponding electric type apparatus. Dismantling and reassembling of this apparatus requires no special skill and it is easy to maintain. Therefore, maintenance cost is low and frequency of break down is small. Since all ships carry compressed air, compressed air can be obtained easily and a special device for producing compressed air is not required, when the air-oil remote steering apparatus constituting the present invention is used. In the accompanying drawings:

Figure 1:
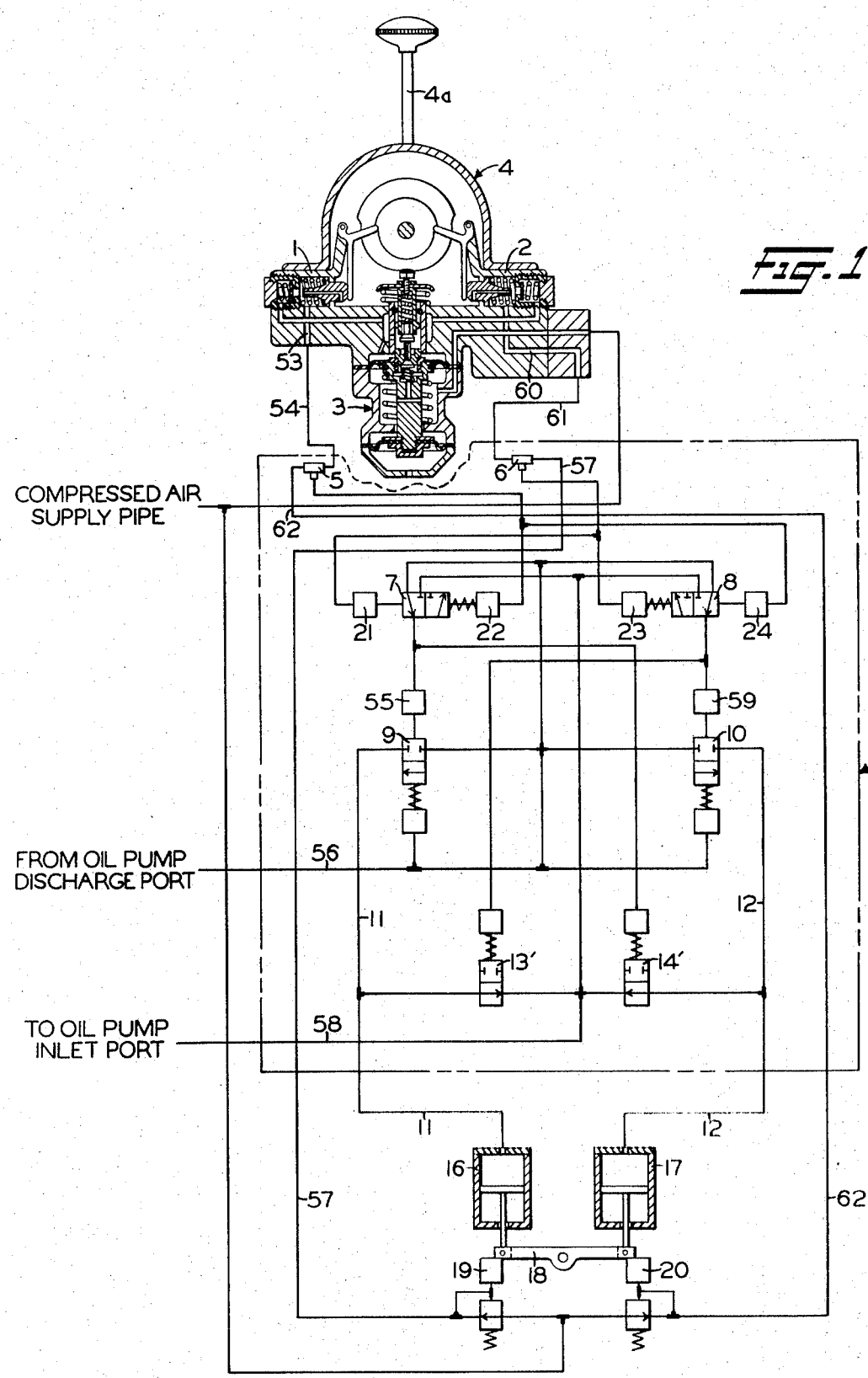
FIG. 1 is a diagrammatic view, partly in section, of a ship steering control system embodying the invention.

As shown in FIG. 1 of the drawings, a manually operated steering control valve device 4, which may be substantially the same in construction and operation as the control valve device shown and described in U.S. Pat. No. 2,355,758, issued Aug. 15, 1944 to Roy R. Stevens, and assigned to the assignee of the present application, comprises two directional control or on-off valve devices 1 and 2 through one or the other of which a self-lapping valve device 3 supplies fluid under pressure from a compressed air supply pipe to the right-hand end of a double check valve device 5 or the left-hand end of a double check valve device 6 accordingly as a handle 4a is rocked in one direction or in an opposite direction from the position in which it is shown.

Figure 2:
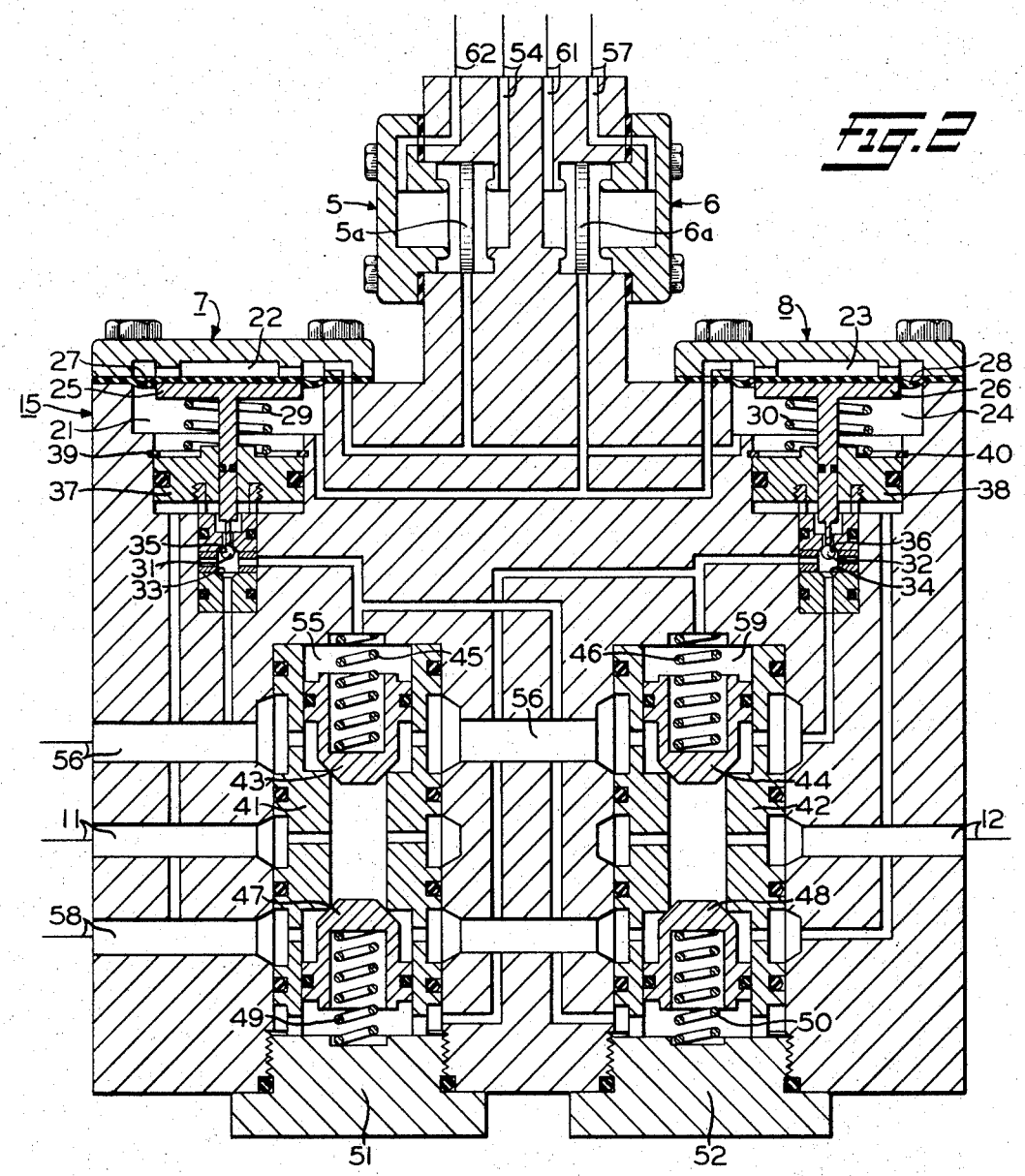
FIG. 2 is a cross-sectional view of a pneumatically-controlled hydraulic valve mechanism for controlling the supply of hydraulic fluid under pressure to and the release of hydraulic fluid under pressure from a pair of hydraulic pressure operated fluid motors that control the position of the rudder of a ship.

A rudder control mechanism 15 shown diagrammatically in FIG. 1 and in section in FIG. 2 comprises the above-mentioned pair of double check valve devices 5 and 6 and, as shown in FIG. 2, on the respective opposite sides of these valve devices 5 and 6 a pair of fluid under pressure, such as air, operated supply and release valve devices 7 and 8. As shown diagrammatically in FIG. 1, the valve devices 7 and 8 in turn control respectively fluid under pressure, such as, oil supply and release valve devices 9 and 13' and 10 and 14'. The oil pressure supply and release valve devices 9 and 13' control the supply and release of oil under pressure to and from a first oil pressure operated cylinder 16 via a pipe 11. Likewise, the oil pressure supply and release valve devices 10 and 14' control the supply and release of oil under pressure to and from a second oil pressure operated cylinder 17 via a pipe 12.

As shown in FIG. 1, a rudder 18 that is pivotally mounted midway its ends has its left-hand end operatively connected to one end of a piston rod secured at its opposite end to the piston of the cylinder 16. The right-hand end of the rudder 18 is operatively connected to one end of a piston rod secured at its opposite end to the piston of the cylinder 17.

Figure 3:
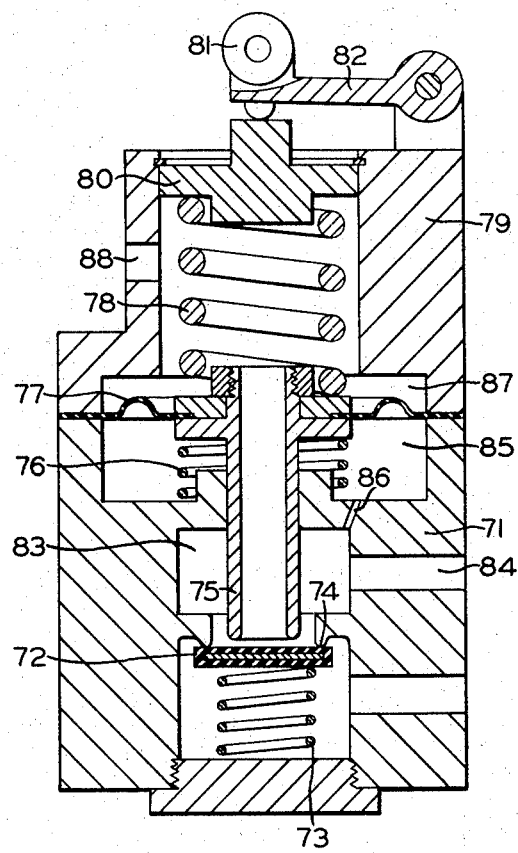
FIG. 3 is a cross-sectional view of a rudder-operated pneumatic self-lapping valve device for supplying a pneumatic fluid under pressure to cause self-lapping operation of the valve mechanism shown in FIG. 2.

Furthermore, as shown in FIG. 1, the left-hand end of the rudder 18 controls the operation of a first self-lapping valve device 19 while the right-hand end thereof controls operation of a second self-lapping valve device 20, the construction of these self-lapping valve devices being identical and shown in detail in FIG. 3 of the drawings. These self-lapping valve devices 19 and 20 each have a supply port and a delivery port, the supply port of each self-lapping valve device being connected to the compressed air supply pipe. The outlet port of the valve device 19 is connected by a pipe 57 to the right-hand end of the double check valve device 6, and the outlet port of the valve device 20 is connected by a pipe 62 to the left-hand end of the double check valve device 5.

FIG. 2 shows, in cross-section, the air pressure-controlled oil pressure-operated rudder control mechanism 15. This air pressure-controlled oil pressure-operated rudder control mechanism 15 comprises a casing that has embodied therein on the upper side thereof the double check valve devices 5 and 6 and on the respective opposite sides of these check valve devices the supply and release valve devices 7 and 8 which are operated by diaphragms subject to air under pressure.

The supply and release valve device 7 comprises a diaphragm 27 secured to the casing by a cover and cooperating with the cover and casing to form on the respective opposite sides thereof a pair of chambers 21 and 22. Disposed in the chamber 21 and secured, as for example, by bonding, to the lower side of the diaphragm 27 is a diaphragm follower 25 between which and the casing is a spring 29 that is effective to normally bias the diaphragm 27 against a stop on the cover so that a valve operating stem integral with the diaphragm follower 25 occupies the position shown in FIG. 2 in order that a ball valve 31 may be unseated from a supply valve seat 33 by oil under pressure and forced into contact with an exhaust valve seat 35. The exhaust valve seat 35 is formed at the lower end of a bore in a cylindrical member secured by external screw threads provided at its upper end to a valve seat member 37 having internal screw threads and retained in place by a snap ring 39.

The construction of the supply and release valve device 8 is the same as that of the supply and release valve 7 and comprises a diaphragm 28 on the respective opposite sides of which are chambers 23 and 24, a diaphragm follower 26, a spring 30, a ball valve 32, a supply valve seat 34, an exhaust valve seat 36, a valve seat member 38 and a snap ring 40.

The ball valves 31 and 32 (FIG. 2) control the operation of the oil pressure operated valve devices 9, 10, 13', and 14' (FIG. 1) which are embodied in the rudder control mechanism 15.

The oil pressure-operated valve devices 9 and 13', as shown in FIG. 2, comprise a ported stepped bushing 41 having a pair of opposed valve seats, a supply valve 43 normally biased against its seat by a spring 45 interposed between this valve 43 and the casing, an exhaust valve 47 normally biased against its seat by a spring 49 interposed between this valve 47 and a screw-threaded plug 51 that has screw-threaded engagement with internal screw threads provided therefor in the casing at the lower end of a bottomed bore provided in this casing for receiving the bushing 41.

Referring to FIG. 1 of the drawing, it will be seen that the outlet of the on-off valve device 1 is connected to the right-hand inlet of the double check valve device 5 by a passageway 53 and a pipe 54 which pipe, as shown in FIG. 2, is connected by a correspondingly numbered passageway to the right-hand side, as viewed in FIG. 2, of a valve element 5a of the double check valve device 5. Opening at the left-hand side of the valve element 5a, as viewed in FIGS. 1 and 2, is a passageway to which the hereinbefore-mentioned pipe 62 is connected.

As shown in FIGS. 1 and 2, the outlet of the double check valve device 5 is connected by passageways in the casing and cover to the chambers 22 and 23.

In the absence of fluid under pressure in the chamber 22, the spring 29 is effective to bias the diaphragm 27, diaphragm follower 25 and the valve stem integral therewith to the position shown in FIG. 2. Therefore, it is apparent from FIG. 2 that oil under pressure may be supplied to a chamber 55 above the supply valve 43 from an oil under pressure supply passageway 56 that is connected by a correspondingly numbered pipe to the discharge port of an oil pump (not shown) since this oil under pressure will unseat the ball valve 31 from its supply valve seat 33 and move it into seating contact, as shown in FIG. 2, with its exhaust valve seat 35. The oil under pressure thus supplied to the chamber 55, in cooperation with the spring 45, is effective to maintain the oil supply valve 43 seated on its seat to cut off the supply of oil under pressure from the oil supply passageway 56 to a passageway in the casing to which one end of the hereinbefore-mentioned pipe 11 is connected, the other end of this pipe 11 being connected to the upper end of cylinder 16, as shown in FIG. 1.

It will be seen from FIGS. 1 and 2 that the outlet of the self-lapping valve 19 is connected by the hereinbefore-mentioned pipe 57 and a correspondingly numbered passageway to the right-hand side of a valve element 6a.

It can be seen from FIG. 2 that the spring 49 is normally effective to bias the exhaust valve 47 against its seat to cut off flow from the passageway in the casing to which the pipe 11 is connected to another passageway in this casing to which one end of a pipe 58 is connected. The other end of this pipe 58 is connected to the inlet port of the oil pump so that this pipe constitutes an oil return pipe.

The oil pressure-operated valve devices 10 and 14' (FIG. 1) are identical in construction to the oil pressure-operated valve devices 9 and 13' and comprise a bushing 42 (FIG. 2), a supply valve 44, a spring 46, an exhaust valve 48, a spring 50 and a plug 52. The casing is provided with suitable passageways in order that the supply valve 44 may control flow from the oil supply pipe and passageway 56 to the hereinbefore-mentioned pipe 12 that is connected to the cylinder 17 (FIG. 1), and the exhaust valve 48 may control flow from the pipe 12 to the oil return pipe 58.

In the absence of fluid under pressure in the chamber 23, the spring 30 biases the diaphragm 28, diaphragm follower 26 and the valve stem integral therewith to the position shown in order that oil under pressure from the oil supply pipe and passageway 56 may force the ball valve 32 against the exhaust valve seat 36 and flow to a chamber 59 to assist the spring 46 in maintaining the supply valve 44 seated on its seat to cut off flow of oil under pressure from the oil supply pipe and passageway 56 to the pipe 12 that is connected to the cylinder 17 (FIG. 1).

As shown in FIG. 1, the outlet of the on-off valve device 2 is connected by a passageway 60 and a pipe 61 to the left-hand inlet of the double check valve device 6, this pipe 61 being connected, as shown in FIG. 2, by a correspondingly numbered passageway to the left-hand side of the valve element 6a.

As hereinbefore stated, the construction of the self-lapping valve devices 19 and 20 is shown in detail in FIG. 3 of the drawings, As shown in FIG. 3, each of the self-lapping valve devices 19 and 20 comprises a casing 71 having therein a chamber to which air under pressure is supplied from the compressed air supply pipe via a branch of this supply pipe. Disposed in this chamber are a disc valve 72 that serves both as a supply valve and also as a release valve, and a spring 73 that normally biases the valve 72 against a supply valve seat 74.

Slidably mounted in a bore in the casing 71 is a hollow cylindrical sleeve 75 that constitutes an exhaust valve. Intermediate its ends the sleeve 75 is provided with an outturned flange between the lower side of which and the casing 71 is interposed a spring 76.

The inner periphery of a diaphragm 77 is clamped between the upper side of the flange on the sleeve 75 and a diaphragm follower by a nut that has screw-threaded engagement with external screw threads provided therefor on the upper end of the sleeve 75. A spring 78 is interposed between the diaphragm follower and one side of a spring seat 80 that is slidably mounted in a bore provided therefor in a cover 79 between the lower end of which and the upper end of the casing 71 the outer periphery of the diaphragm 77 is rigidly clamped. Upward movement of spring seat 80 in the bore in cover 79 is limited by a snap ring.

A cam roller 81 is rotatably mounted on one side of one end of a lever 82 that at its other end is pivotally mounted on a pin the opposite ends of which are anchored in the jaws of a clevis formed integral with the cover 79. The other side of the one end of the lever 82 is provided with a boss that abuts the upper end of the spring seat 80 and the roller 81 abuts one end of the rudder 18 the rocking of which about its center operates the respective self-lapping valve device at this one end of the rudder.

As shown in FIG. 3, opening into a delivery chamber 83 within the casing 71 is one end of a passageway 84 to the opposite end of which is connected one end of either the pipe 57 or the pipe 62. This delivery chamber 83 is connected to a chamber 85 below the diaphragm 77 by a passageway 86 of small diameter so that this passageway constitutes a choke.

A chamber 87 above the diaphragm 77 is constantly open to atmosphere via a port 88 provided in the cover 79.

While the rudder 18 occupies its horizontal position shown in FIG. 1, the chamber 83 and the pipe 57 or 62 connected thereto via the passageway 84 is open to atmosphere via the hollow sleeve 75, chamber 87 and port 88. Since the chamber 85 is open to the chamber 83 via the choke 86, this chamber 85 is likewise vented to atmosphere. Consequently, spring 73, 76 and 78 maintain the parts of each self-lapping valve device 19 and 20 in the position shown in FIG. 3 so long as the rudder 18 occupies its horizontal position in which it is shown in FIG. 1.

OPERATION

Assume that the rudder 18 of a ship occupies the position shown in FIG. 1 of the drawings. To turn the ship to the right (starboard), the handle 4a of the steering control valve device 4 is rocked counterclockwise or in the direction of the left hand, as viewed in FIG. 1, to cause the smaller one of the two cams shown to operate the on-off valve device 1 in the manner described in hereinbefore-mentioned U.S. Pat. No. 2,355,758 to establish a communication through which the self-lapping valve device 3, that is simultaneously operated by the larger cam, supplies air under pressure from the compressed air supply pipe to the right-hand inlet of the double check valve device 5 via passageway 53 and pipe 54.

Referring to FIG. 2, it may be seen that the air under pressure supplied to the pipe and passageway 54 will force the valve element 5a against its left-hand seat and flow through the passageways in the casing to the chamber 22 above the diaphragm 27 and the chamber 24 below the diaphragm 28. The pressure obtained in the chambers 22 and 24 corresponds to the angle through which the handle 4a is rocked from the position shown in FIG. 1.

The air under pressure supplied to the chamber 22 is effective to deflect the diaphragm 27 downward against the yielding resistance of the spring 29 and move the diaphragm follower 25 together with the valve stem integral therewith downward to first unseat ball valve 31 from exhaust valve seat 35 and thereafter move this valve 31 into seating contact with supply valve seat 33 to close communication between the oil pressure supply pipe and passageway 56 and the chamber 55 and connect this chamber 55, and also the chamber below exhaust valve 48, to the oil return pipe 58 via the exhaust valve seat 35. Consequently, the pressure of the oil in the chamber 55 and below valve 48 will be reduced to substantially atmospheric pressure.

Oil under pressure from the oil supply pipe and passageway 56 will now unseat the oil supply valve 43 from its seat and flow past the unseated valve 43 to the upper end of the oil pressure-operated cylinder 16 (FIG. 1) via the busing 41 (FIG. 2) and pipe 11 (FIG. 1). This supply of oil under pressure to the upper end of cylinder 16 acts on the upper face of the piston of this cylinder 16 and is effective via the piston rod connected to this piston to rock the rudder 18 counterclockwise, as viewed in FIG. 1.

Since the left-hand end of the rudder 18 abuts the roller 81 (FIG. 3) of the self-lapping valve device 19 (FIG. 1), counterclockwise rocking of rudder 18 rocks lever 82 of this valve device counterclockwise, as viewed in FIG. 3, to move spring seat 80, spring 78, diaphragm 77, and exhaust valve 75 downward until the lower end of valve 75 abuts the upper side of valve 72 to cut off chamber 83 from atmosphere. Further counterclockwise rocking of lever 82 effects unseating of disc valve 72 from its seat 74.

Upon the unseating of valve 72 from seat 74, air under pressure from the compressed air supply pipe will flow past unseated valve 72 to chamber 83 of self-lapping valve device 19 and thence to the right-hand end of double check valve 6 (FIGS. 1 and 2) via passageway 84 and pipe 57.

As may be seen from FIG. 2, air under pressure from the pipe 57 forces the valve element 6a against its left-hand seat and flows through passageways in the casing to the chamber 21 below the diaphragm 27 and the chamber 23 above the diaphragm 28.

It will be noted from FIG. 2 that the air under pressure supplied to the chamber 24 in the manner hereinbefore described is effective to maintain the diaphragm 28, diaphragm follower 26 and the stem integral therewith in the position shown so that oil under pressure from the pipe and passageway 56 will maintain the ball valve 32 against the exhaust valve seat 36 and flow to the chamber 59 to assist the spring 46 in maintaining valve 44 seated to close communication between the oil supply pipe and passageway 56 and the pipe 12.

It may be seen from FIGS. 1 and 2 that as the piston of cylinder 16 moves downward to rock the rudder 18 counterclockwise, the right-hand end of rudder 18 is effective to move the piston of cylinder 17 upward. Since the chamber below exhaust valve 48 has been connected to the oil return line 58, as hereinbefore explained, upward movement of the piston in the cylinder 17 forces oil under pressure through the pipe 12 to effect unseating of exhaust valve 48 (FIG. 2) from its seat against the yielding resistance of spring 50. Upon the unseating of exhaust valve 48, oil will flow from the pipe 12 to the oil return line 58 as the piston of cylinder 17 is moved upward by the rudder 18.

Upon the supply of air under pressure to the chamber 21 (FIG. 2) below the diaphragm 27 by operation of the self-lapping valve device 19, the pressure in this chamber 21 will increase. When the pressure in the chamber 21 has increased to a value substantially equal to the pressure in the chamber 22, the spring 29 will move the diaphragm 27, diaphragm follower 25 and the valve stem integral therewith upward to the position shown in FIG. 2. As this valve stem moves upward, the oil under pressure from the pipe and passageway 56 first unseats the ball valve 31 from supply valve seat 33 and then seats this valve on exhaust valve seat 35.

When ball valve 31 is thus unseated, oil under pressure flows from supply pipe and passageway 56 to the chamber 55 to cause seating of oil supply valve 43 on its seat thereby preventing further supply of oil under pressure to the pipe 11 and cylinder 16. Oil under pressure flows from the chamber 55 to the chamber below exhaust valve 48 to effect seating of this valve on its seat thereby cutting off flow of oil from the cylinder 17 and pipe 12 to the oil return pipe 58.

Since the supply of oil under pressure to the cylinder 16 and the release of oil from the cylinder 17 has been cut off, the rudder 18 will be maintained in the position to which it has been rocked in the manner described above.

From the foregoing it is apparent that upon the rocking of the handle 4a through any chosen angle in a counterclockwise direction from the position shown in FIG. 1, a corresponding degree of air under pressure will be established in the chambers 22 and 24 (FIG. 2). Furthermore, it is apparent that as the pressure in the chamber 22 is increased, the rudder 18 (FIG. 1) is rocked counterclockwise, as viewed in FIG. 1, to cause operation of the self-lapping valve device 19 to effect the supply of air under pressure to the chambers 21 and 23 until the pressure in these chambers is substantially equal to that in chambers 22 and 24, whereupon the supply of oil under pressure to the cylinder 16 and release of oil from cylinder 17 to cause counterclockwise rocking of the rudder 18 is terminated. Thus, the rudder 18 is rocked counterclockwise through an angle corresponding to the angle through which the handle 4a was arcuately moved.

If now the handle 4a is arcuately moved clockwise toward or to the position shown in FIG 1, the self-lapping valve device 3 will be operated by the larger cam to effect a reduction of the air pressure in chambers 22 and 24 (FIG. 2). This reduction of air pressure in chamber 22 renders spring 29 effective in cooperation with the air under pressure in chamber 21 to return diaphragm 27, diaphragm follower 25 and the stem integral therewith toward or to the position shown in FIG. 2 whereupon oil under pressure seats ball valve 31 on seat 35 and flows to chamber 55 to seat oil valve 43 on its seat thereby cutting off flow of oil under pressure to cylinder 16 via pipe 11. Oil under pressure supplied to chamber 55 also flows to the chamber below valve 48 to seat this valve on its seat thereby preventing further release of oil from pipe 12 and cylinder 17 to the oil return pipe 58.

It being remembered that the counterclockwise rocking of the rudder 18 causes the self-lapping valve device 19 to establish a pressure in the chambers 21 and 23 that is equal to that established in the chambers 22 and 24 by self-lapping valve device 3 (FIG. 1), it will be apparent that as this valve device 3 is operated to reduce the pressure in the chambers 22 and 24 (FIG. 2) in response to the manual clockwise rocking of the handle 4a toward or to the position shown in FIG. 1, the higher pressure in the chamber 23 (FIG. 2) will deflect the diaphragm 28 downward to effect seating of ball valve 32 on seat 36 to release oil under pressure from chamber 59 and the chamber below exhaust valve 47.

Oil under pressure will now unseat oil supply valve 44 from its seat and flow from oil supply pipe 56 to the upper end of cylinder 17 via pipe 12 (FIG. 1).

The supply of oil under pressure to the upper end of cylinder 17 will effect clockwise rocking of the rudder 18 toward or to the position in which it is shown in FIG. 1 via the piston and piston rod of cylinder 17.

This clockwise rocking, as viewed in FIG. 1, of the rudder 18 is effective to cause simultaneous operation of the self-lapping valve device 19 to effect the release of air under pressure from the chambers 21 and 23 (FIG. 2) to atmosphere, and operation of the self-lapping valve device 20 (FIG. 1) to effect the supply of air under pressure to the chambers 22 and 24 (FIG. 2) via pipe 62, left-hand end of double check valve device 5 and the passageways in the casing.

The supply of air under pressure to the chamber 22 (FIG. 2) as air under pressure is released from chamber 21 causes unseating of oil supply valve 43 to cause the supply of oil under pressure to pipe 11 and upper end of cylinder 16 (FIG. 1), and unseating of exhaust valve 48 (FIG. 2) to release oil from pipe 12 and the upper end of cylinder 17 (FIG. 1) to oil return pipe 58 simultaneously as air under pressure supplied to the chamber 24 and released from the chamber 23 causes seating of oil supply valve 44 to cut off the supply of oil under pressure to the pipe 12 and the upper end of the cylinder 17 and seating of exhaust valve 47 on its seat to cut off release of oil from pipe 11 and the upper end of piston 16 to oil return pipe 58.

From the foregoing it is apparent that as the handle 4a of manually operated steering control valve device 4 is rocked clockwise toward and to the position in which it is shown in FIG. 1, the rudder 18 is rocked clockwise toward and to its horizontal position in which it is shown.

To turn the ship to the left (larboard), the handle 4a of the steering control valve device 4 is rocked clockwise or in the direction of the right hand, as viewed in FIG. 1, to cause the smaller cam to operate the on-off valve device 2, in the manner described in the hereinbefore-mentioned United States patent, to establish a communication through which the self-lapping valve device 3, that is simultaneously operated by the larger cam, supplies air under pressure from the air supply pipe to the left-hand end of the double check valve device 6 via passageway 60 and pipe 61.

As may be seen from FIG. 2, this air under pressure forces the valve element 6a against its right-hand seat and flows to the chambers 21 and 23 via the passageways in the casing, the pressure obtained in these chambers corresponding to the amount of clockwise arcuate movement of the handle 4a from the position shown in FIG. 1.

In view of the foregoing description of operation of the supply and release valve device 7, it is apparent that this supply of air under pressure to the chamber 23 of the valve device 8 will cause: (1) seating of ball valve 32 on supply valve seat 34 to effect the release of oil under pressure from chamber 59 and the chamber below exhaust valve 47, (2) unseating of valve 44 from its seat to effect the supply of oil under pressure from the oil supply pipe and passageway 56 to the upper end of the cylinder 17 via pipe 12, and (3) provide for unseating of exhaust valve 47 from its seat to establish a communication through which oil may flow from the upper end of cylinder 16 to the oil return pipe 58 via pipe 11 and past unseated exhaust valve 47.

This supply of oil under pressure to the upper end of cylinder 17 is effective to cause clockwise rocking of the rudder 18. This clockwise rocking of the rudder 18 is effective to cause: (1) the piston of cylinder 16 to move upward and force oil from the upper end of this cylinder into the oil return pipe 58 via pipe 11 and past exhaust valve 47 which is unseated from its seat by oil under pressure from the pipe 11, (2) operation of the self-lapping valve device 19 to release air under pressure from the chambers 21 and 23 (FIG. 2) to atmosphere, and (3) operation of the self-lapping valve device 20 to effect the supply of air under pressure to the chambers 22 and 24 simultaneously as air under pressure is released from the chambers 21 and 23 until the rudder 18 has been rocked clockwise through the same angle as the angle through which the handle 4a has been arcuately moved.

If now the handle 4a be manually rocked counterclockwise toward or to the position in which it is shown in FIG. 1, the rudder 18 will be rocked counterclockwise to a corresponding position.

Having now described the invention what I claim as new and desire to secure by Letters Patent, is:

1. In a marine-vessel steering apparatus having a rudder and a pair of hydraulically-responsive fluid motors operatively connected to the respective opposite ends of the rudder for controlling the position thereof, the combination of:
   a. a hydraulically-operated valve mechanism for simultaneously effecting the supply of a hydraulic fluid under pressure to either one of said hydraulically-responsive fluid motors while providing for the release of hydraulic fluid from the other,
   b. pneumatically-operated means for controlling operation of said hydraulically-operated valve mechanism,
   c. a manually-actuated valve device selectively actuable to a chosen degree in one direction or in an opposite direction to cause said pneumatically-operated means to so control operation of said hydraulically-operated valve mechanism that a hydraulic fluid under pressure is supplied to a desired one of said hydraulically-responsive fluid motors, and
   d. a pair of self-lapping valve devices selectively operable accordingly as the rudder is rocked in one direction or in an opposite direction to cause operation of said pneumatically-operated means to so control operation of said hydraulically-operated valve mechanism that the supply of hydraulic fluid under pressure to the desired one of said hydraulically-responsive fluid motors is terminated upon rocking of the rudder by one of said fluid motors to a degree corresponding to the degree of manual actuation of said manually-actuated valve device.

2. A marine-vessel steering apparatus, as recited in claim 1, further characterized in that one end of said rudder is operatively connected to one of said pair of hydraulically-responsive fluid motors whereby said rudder is rockable thereby in one direction and to one of said pair of self-lapping valve devices whereby said one valve device is operable upon rocking of said rudder in said one direction to supply a pneumatic fluid under pressure to said pneumatically-operated means and operable upon rocking of said rudder in an opposite direction to release pneumatic fluid under pressure from said pneumatically-operated means, and the other end of said rudder is operatively connected to the other of said pair of hydraulically-responsive fluid motors whereby said rudder is rockable thereby in said opposite direction and to the other of said pair of self-lapping valve devices whereby said other self-lapping valve device is operable upon rocking of said rudder in said opposite direction to supply a pneumatic fluid under pressure to said pneumatically-operated means and operable upon rocking of said rudder in said one direction to release pneumatic fluid under pressure from said pneumatically-operated means.

3. A marine-vessel steering apparatus, as recited in claim 1, further characterized in that one of said pair of self-lapping valve devices is operable to produce a degree of fluid under pressure proportional to the degree of rocking of said rudder in one direction from a chosen position, and the other of said pair of self-lapping valve devices is operable to produce the same degree of fluid under pressure proportional to the same degree of rocking of said rudder in an opposite direction from said chosen position, said one self-lapping valve device being operable to proportionally reduce said degree of fluid under pressure upon subsequent rocking of said rudder in said opposite direction, and said other self-lapping valve device being operable to proportionally reduce said same degree of fluid under pressure upon subsequent rocking of said rudder in said one direction whereby said pneumatically-operated means controls operations of said hydraulically-operated valve mechanism in accordance with variations in the difference in the degree of pneumatic fluid pressure established by said manually-actuated valve device and the degree of fluid under pressure established by one or the other of said pair of self-lapping valve devices.

4. A marine-vessel steering apparatus, as recited in claim 1, further characterized in that said pneumatically-operated means comprises:
   a. a first valve means operable to cause operation of said hydraulically-operated valve mechanism to effect the supply of hydraulic fluid under pressure to one of said pair of hydraulically-responsive fluid motors while providing for the release of hydraulic fluid from the other,
   b. a first abutment for controlling operation of said first valve means accordingly as pneumatic fluid under pressure is supplied to one or the other side thereof,
   c. a second valve means operable to cause operation of said hydraulically-operated valve mechanism to effect the supply of hydraulic fluid under pressure to the other of said pair of hydraulically-responsive fluid motors while providing for the release of hydraulic fluid from said one fluid motor,
   d. a second movable abutment for controlling operation of said second valve means accordingly as pneumatic fluid under pressure is supplied to one or the other side thereof,
and said manually-actuated valve device is selectively operable to effect the supply of a pneumatic fluid under pressure simultaneously to said one side of said first abutment and said other side of said second abutment or simultaneously to said other side of said first abutment and said one side of said second abutment.

5. A marine-vessel steering apparatus, as recited in claim 2, further characterized by a first double check valve device through which said manually-actuated valve device, or one of said pair of self-lapping valve devices, selectively supplies a pneumatic fluid under pressure simultaneously to said one side of said first abutment and said other side of said second abutment.

6. A marine-vessel steering apparatus, as recited in claim 2, further characterized by a first double check valve device through which said manually-actuated valve device, when actuated in said one direction, or one of said pair of self-lapping valve devices selectively supplies a pneumatic fluid under pressure simultaneously to said one side of said first abutment and said other side of said second abutment, and a second double check valve device through which said manually-actuated valve device, when actuated in said opposite direction, or the other of said pair of self-lapping valve devices, selectively supplies a pneumatic fluid under pressure simultaneously to said other side of said first abutment and said one side of said second abutment.

7. A marine-vessel steering apparatus, as recited in claim 2, further characterized in that said manually-actuated valve device comprises a self-lapping valve device and a pair of on-off valve devices one of which, when said manually-actuated valve device is actuated in said one direction, cooperates with said self-lapping device to provide for the simultaneous establishment of any selected degree of pneumatic fluid under pressure between a minimum and a maximum on said one side of said first abutment and on said other side of said second abutment, and the other of which on-off valve device, when said manually-actuated valve device is actuated in said opposite direction, cooperates with said self-lapping valve device to provide for the simultaneous establishment of any selected degree of pneumatic fluid under pressure between said minimum and said maximum on said one side of said second abutment and on said other side of said first abutment, and one of said pair of self-lapping valve devices is operable in response to the rocking of said rudder in one direction, subsequent to actuation of said manually-actuated valve device in said one direction, to effect the supply of pneumatic fluid under pressure simultaneously to said other side of said first abutment and said one side of said second abutment until substantially equal pressures are present on the respective opposite sides of said first and second abutments whereby said first abutment is rendered effective to operate said first valve means to cause said hydraulically-operated valve mechanism to terminate the supply of hydraulic fluid under pressure to said one hydraulically-responsive fluid motor, and said second abutment is rendered effective to operate said second valve means to cause said hydraulically-operated valve mechanism to terminate the release of hydraulic fluid from said other hydraulically-responsive fluid motor, the other of said pair of self-lapping valve devices being operable in response to the rocking of said rudder in an opposite direction, subsequent to actuation of said manually-actuated valve device in said opposite direction, to effect the supply of pneumatic fluid under pressure simultaneously to said one side of said first abutment and said other side of said second abutment until substantially equal pressures are present on the respective opposite sides of said first and second abutments whereby said second abutment is rendered effective to operate said second valve means to cause said hydraulically-operated valve mechanism to terminate the supply of hydraulic fluid under pressure to said other hydraulically-responsive fluid motor, and said first abutment is rendered effective to operate said first valve means to cause said hydraulically-operated valve mechanism to terminate the release of hydraulic fluid from said one hydraulically-responsive fluid motor.

8. A marine-vessel steering apparatus, as recited in claim 7, further characterized by a pair of double check valve devices each having a pair of inlet ports and an outlet port, one of said double check valve devices having one inlet port connected to one of said pair of on-off valve devices, the other inlet port connected to one of said pair of self-lapping valve devices, and the outlet port connected to said other side of said first abutment and said one side of said second abutment, and the other of said double check valve devices having one inlet port connected to the other of said pair of on-off valve devices, the other inlet port connected to the other of said pair of self-lapping valve devices, and the outlet port connected to said one side of said first abutment and said other side of said second abutment whereby said pair of double check valve devices cooperate with said pair of on-off valve devices and said pair of self-lapping valve devices to provide for the attainment of substantially equal pressures on the opposite sides of each of said first and second abutments to effect termination of the supply of hydraulic fluid under pressure to said hydraulically-responsive fluid motors.

9. A marine-vessel steering apparatus, as recited in claim 7, further characterized by a resilient means interposed between said rudder and each of said pair of self-lapping valve devices, said resilient means effecting operation of the respective self-lapping valve device in response to rocking of said rudder by one of said hydraulically-responsive fluid motors and enabling the self-lapping operation of the respective valve device without effecting rocking of said rudder from the position to which it is rocked by said one hydraulically-responsive fluid motor.

10. A marine-vessel steering apparatus, as recited in claim 7, further characterized by biasing means disposed on said other side of said first and second abutments, the respective biasing means cooperating with the pneumatic fluid under pressure supplied to said other side of the respective abutment to provide a force that exceeds the fluid pressure force provided by the supply of pneumatic fluid under pressure to the one side of the respective abutment to insure operation of the corresponding valve means to cause said hydraulically-operated valve mechanism to operate to prevent the release of hydraulic fluid from one of said pair of hydraulically-responsive fluid motors.

* * * * *